Aug. 22, 1950 J. L. HURAULT 2,519,836

FREQUENCY MODULATION TRANSMISSION SYSTEM

Filed Feb. 26, 1948 3 Sheets-Sheet 1

INVENTOR
JEAN LOUIS HURAULT

BY Adams & Brush

ATTORNEYS

Aug. 22, 1950 J. L. HURAULT 2,519,836

FREQUENCY MODULATION TRANSMISSION SYSTEM

Filed Feb. 26, 1948 3 Sheets-Sheet 2

INVENTOR
JEAN LOUIS HURAULT

By Adams + Bush

ATTORNEYS

FREQUENCY MODULATION TRANSMISSION SYSTEM

Filed Feb. 26, 1948 3 Sheets-Sheet 3

INVENTOR
JEAN LOUIS HURAULT
By Adams & Bush
ATTORNEYS

Patented Aug. 22, 1950 2,519,836

UNITED STATES PATENT OFFICE 2,519,836

FREQUENCY MODULATION TRANSMISSION SYSTEM

Jean Louis Hurault, Paris, France, assignor to Compagnie Industrielle des Telephones, Paris, France, a corporation of France Application February 26, 1948, Serial No. 11,223
In France February 20, 1947

Section 1, Public Law 690, August 8, 1946
Patent expires February 20, 1967

3 Claims. (Cl. 332—23)

The present invention has for an object to provide a frequency modulating transmitting system in which is used, in transmission, for signal generation, a single tube with fixed transconductance, which permits obtaining a relation for the variation of the frequency of the modulated current as a function of the applied signal amplitude which is perfectly defined and independent, within wide limits, of the tube power supply conditions.

Such a system eliminates using tubes of variable mu or variable transconductance as of variable pitch grid, the characteristics of which present large variations as a function of time, as well as a function of the voltages applied to their various electrodes, which is likely to appreciably interfere with proper transmitter operation.

The system constituting the object of the present invention, includes an oscillator tube, in which the coupling between the grid circuit and the plate circuit is ensured by two circuits, one of which has a variable attentuation as a function of the amplitude of the output signal causing the frequency variations of the modulated current output.

In the drawing:

Fig. 7 shows in detail another type of receiving apparatus, using a ring modulator.

Figure 1 shows as an example one embodiment of the oscillating part of the system according to the present invention.

Figure 1:
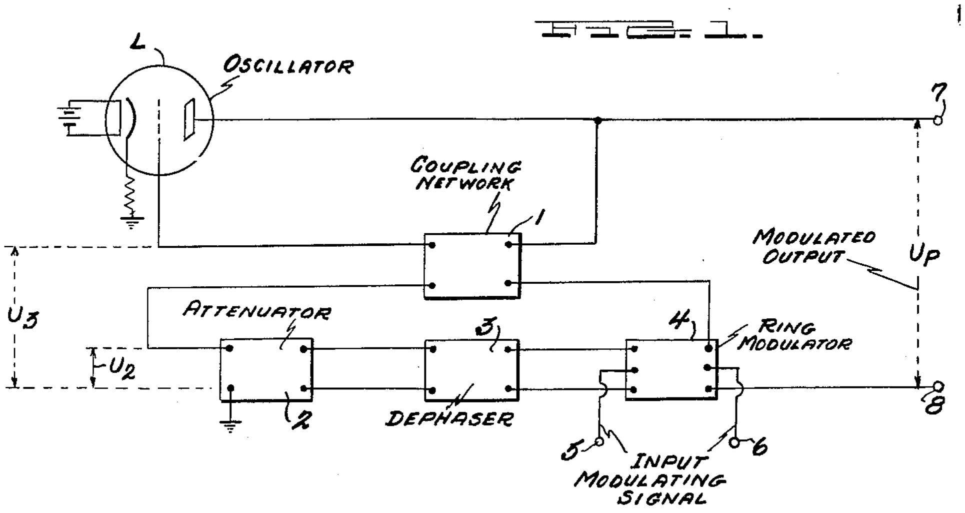
Fig. 1 shows a circuit of a frequency modulation transmitter according to the present invention.

In Figure 1, L indicates the oscillator tube, 1 a quadripole or four terminal network constituting the first coupling circuit between the anode and grid of tube L, and 2, 3 and 4, are quadripoles or four terminal networks which together constitute the second coupling circuit. 5 and 6 are input terminals to which is applied the input signal, and 7 and 8 are the terminals across which is taken off the modulated current output.

The quadripole 1 is constructed so as to cause a dephasing or phase displacement between the output voltage and the input voltage which phase displacement is variable as a function of the frequency. This dephaser quadripole 1 can be constituted, for instance, by means of a lattice band pass filter half unit of constant K type, of which the branches are respectively constituted by a resonant circuit and by an antiresonant circuit. Such a half unit affects for a given frequency $f_0$, the actual phase displacement of the output voltage varying from $-\pi/2$ to $+\pi/2$ in the frequency band limited by the extreme frequencies $f_a$, $f_b$, and cancelling out to zero for frequency $f_0$. The "constant K" filter of any class is a ladder type network of reactances having the property that the product of its series impedance and its shunt impedance is a constant K independent of frequency. Such filters are well known in the literature, and are described, for instance, by Zobel, Bell System Technical Journal, page 4, January, 1923, also in Zobel Patents 1,509,184; 1,557,229; 1,850,146, and in the book by T. E. Shea, "Transmission Networks and Wave Filters," New York, 1946 (page 221).

The second coupling circuit is constituted by quadripoles 2, 3 and 4. Quadripole 2 is an adjustable attenuation line, 3 is a dephaser phase transformer affecting by a constant retarding angle, $\pi/2$ per example, the outgoing voltage relatively to the incoming voltage, and causing also an increasing attenuation with the frequency, and 4 is a modulator controlled by the input signal applied to terminals 5 and 6, and constituted, for example, by a ring modulator, producing at its output terminals, a variable voltage, in phase or in phase opposition with the voltage applied at the input.

The increase of attenuation of the dephasing phase transformer 3 as a function of the frequency has for an object attenuating the harmonics produced in the oscillating tube, and as they are not subjected to the same phase displacement in the dephaser, they appear amplified at the output of the oscillator.

As a form of embodiment, such phase transformer may be constituted by two gamma cells comprising resistances in the series arms and capacities in the parallel arms. When the operating frequency of a dephasing phase transformer so constituted is such that the impedance of the parallel arms is equal to the resistance of the series arms, the output voltage $V_2$ is related to the input voltage $V_1$ by the formula:

$$V_2 - \frac{V_1}{3}$$

This formula shows that the phase difference for the considered frequency is $\pi/2$ and the attenuation 1.1 neper.

For the higher frequencies, calculation shows that harmonic 2 is attenuated by 1.9 nepers and harmonic 3 by 2.49 nepers.

Figure 2:
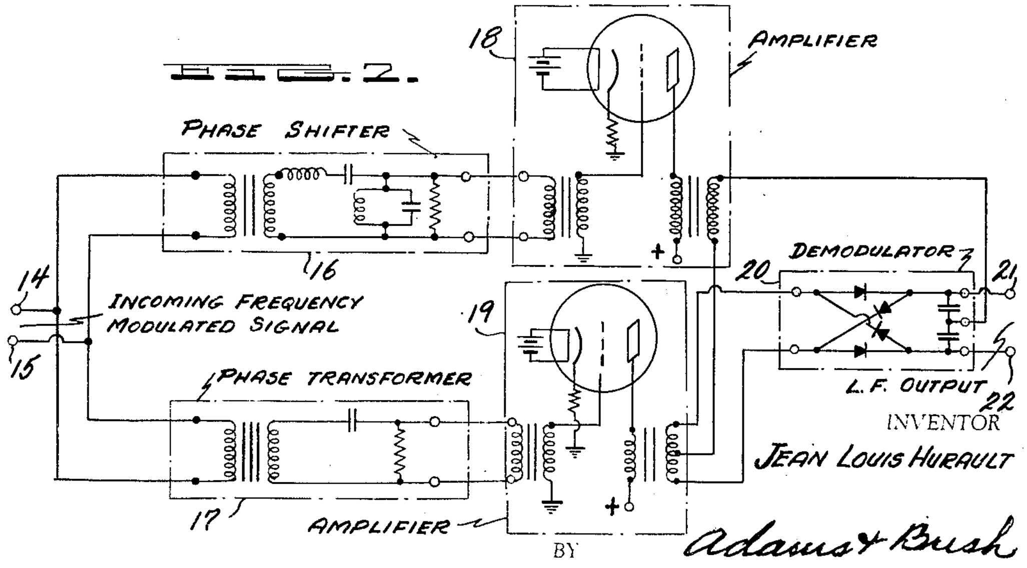
Fig. 2 shows the variation of phase as a function of frequency caused by one of the grid-plate coupling circuits.
Figure 3:
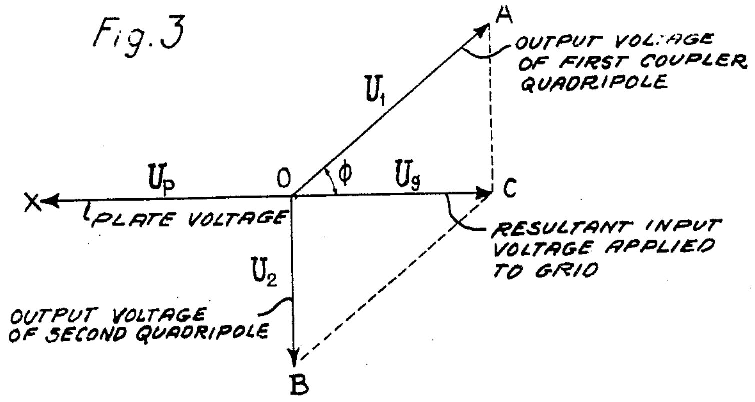
Fig. 3 is a vector diagram showing voltage relations of the grid input voltages.

The operation of such a system will be better understood by referring to the Figures 2 and 3. Figure 2 shows as a function of the frequency, the phase variation effected by a current traversing the dephasing quadripole 1.

Figure 3 is a vector diagram which shows the combination of the voltages acting on the grid of tube L.

In Figure 3 OX shows the voltage $Up$ applied to the plate, OA the voltage $U_1$ at the output terminals of quadripole 1, OB the voltage $U_2$ at the output terminals of quadripole 2, and OC the resulting voltage $Ug$ applied to the grid.

Now, it is well known, that the frequency of the oscillations which can be maintained in an oscillator is the frequency for which there exists exact phase opposition between the grid and plate voltages.

Therefore, vector OC (Fig. 3) representing the phase of voltage $Ug$ acting on the grid, must make an angle of 180° with OX, for the frequency at which the generator is to oscillate.

In fact, voltage $Ug$ is the resultant of component voltages $OA=U_1$ and $OB=U_2$. The voltages at the terminals on the plate sides of quadripole 1 and 4 are in phase with plate voltage $Up$ due to the shunt resistances connected across those terminals; the dephasing phase difference introduced by phase transformer 3 is supposed to be equal to $\pi/2$ on the figure. But the direction of OB would have to be inverted if terminal voltage 5 and 6 should be inverted.

With no $U_2$ voltage at the output terminals of quadripole 2, which corresponds closely to the passage through zero of the modulating voltage, the grid voltage $Ug$ is reduced to the voltage $U_1$ and must be in phase opposition with plate voltage $Up$; due to a suitable selection of the connections of the output terminals of quadripole 1, such opposition is produced for frequency $f_0$.

When the voltage $U_2$ at the output terminals of quadripole 2 assumes a value different from zero, in quadrature in one direction or the other with plate voltage $Up$, the corresponding oscillator frequency becomes fixed due to the condition that the resultant of $U_2$ combined with $U_1$ (the value of that voltage $U_1$ being determined as a function of the frequency), should be in phase opposition with plate voltage $Up$.

Figures 2, 4:
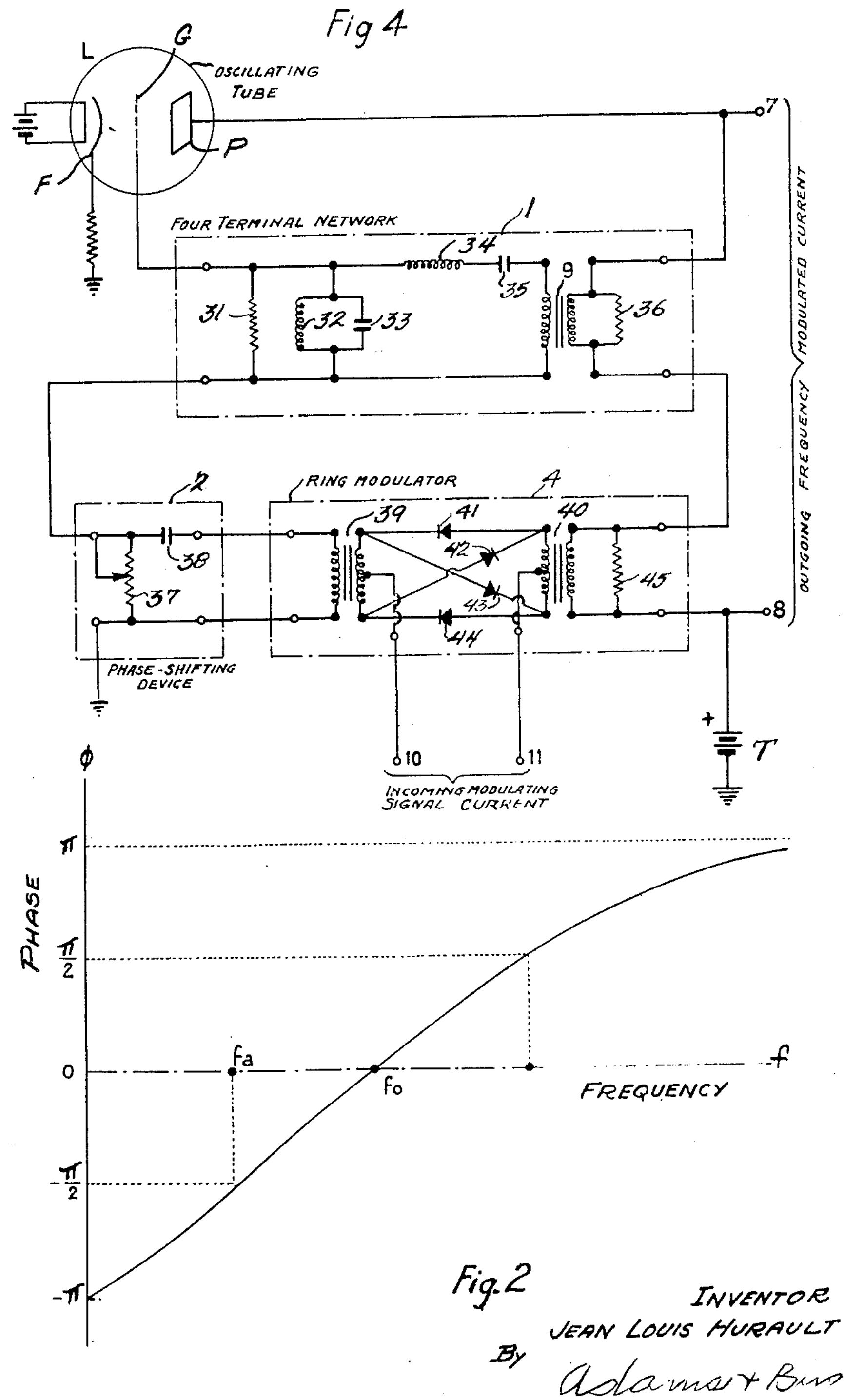
Fig. 4 is a circuit diagram of a modified form of transmitter using for the dephaser, a transformer and a particular type of lattice filter, and using a ring modulator.

Figure 4 shows a modified form of embodiment of the generator according to the invention.

In Figure 4, 9 shows a transformer designed to cause phase opposition between the grid voltage and the tube plate voltage. The variable phase difference quadripole or four terminal network 1 (Figure 1) is constituted by a constant K type lattice band pass filter half unit. The input voltage, applied to input terminals 10 and 11, controls a modulator (modulator 4 of Figure 1), which is in the selected example, a ring modulator constituted by four rectifier elements 41, 42, 43, 44.

The dephasing phase transformer (phase transformer 2, 3 of Figure 1) is constituted by a single capacity 38 and a potentiometer 37; the latter is used as an attenuator and permits adjustment of the extent of the frequency deviation.

Figure 5:
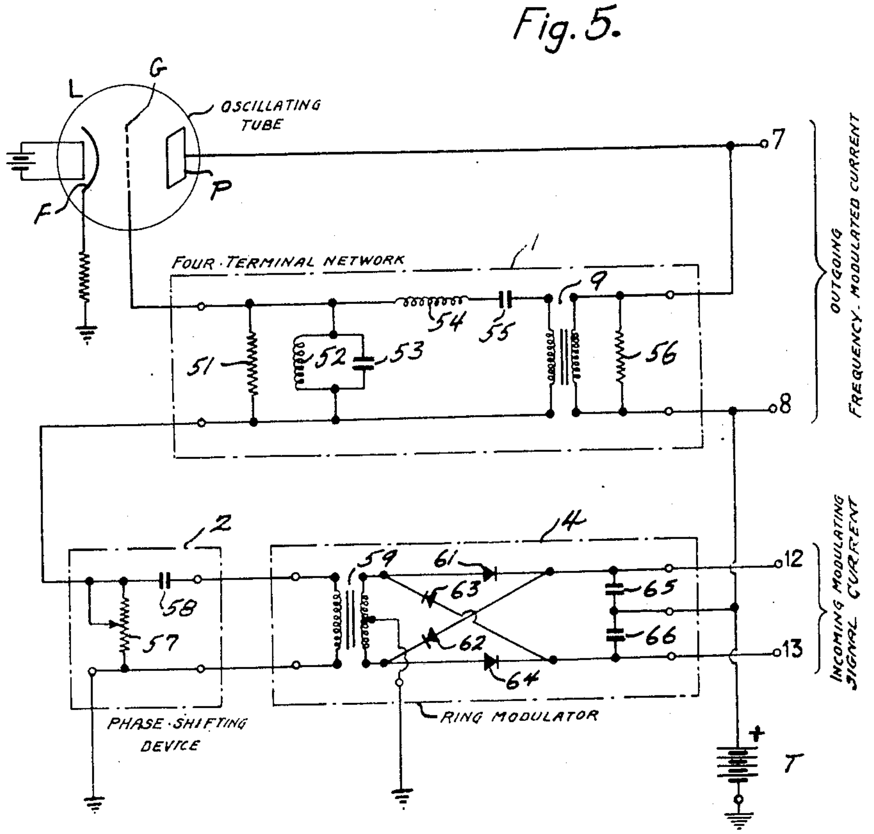
Fig. 5 shows another modified form of transmitter having different arrangement and connections of the ring modulator through condensers.

Figure 5 represents a modified form of embodiment of the generator according to the present invention. The arrangement is different from that of Figure 4 by the type and connections of the ring modulator; the input voltage being applied to terminals 12 and 13. Such arrangement permits a continuous variation of the voltage applied to the grid tube through the dephasing phase transformer.

Figure 6:
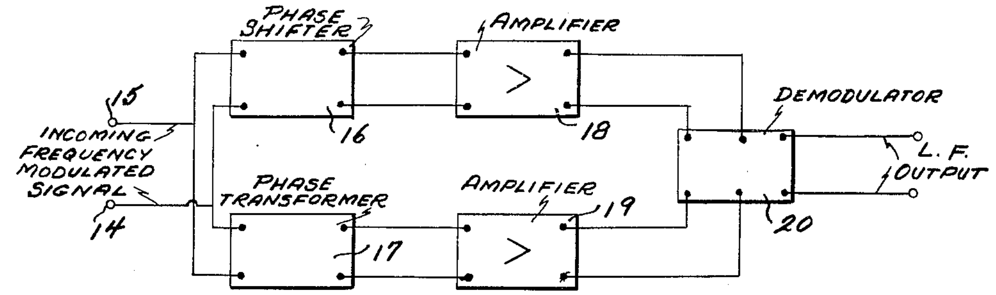
Fig. 6 is a block diagram which shows one type of receiving apparatus for the present system, using two receiving channels.

Figure 6 represents the block diagram of the receiving circuit arrangement. In Figure 6, 14 and 15 are the terminals to which is applied the incoming frequency wave, 16 is a filter providing a quick phase variation about the mean frequency (actual phase difference variation of in the pass band); 17 is a phase transformer producing a phase difference practically constant as a function of the frequency; 18 and 19 are two amplifiers, and 20 a conventional modulator. The low frequency current is taken off at the terminals 21, 22.

Figure 7 represents a type of embodiment of the receiving part, of the system of the present invention, and using a ring modulator.

It can readily be demonstrated that the system, which is the object of the present invention, permits when the phase differences are identical at the transmitter and at the receiver, obtaining a perfectly linear transmission for low initial signal amplitudes, corresponding to small frequency deviations.

What I claim is:

1. In a system of frequency modulation transmission, an oscillator tube with fixed transconductance, a first coupling circuit connected between the grid and the plate of said tube comprising a two-winding transformer, one of whose windings is inserted in the plate circuit of the tube, a lattice constant K type band pass filter half unit, the other winding of said transformer being connected to the grid of said tube through said unit, and a second coupling circuit between the grid and the plate of said tube comprising a modulator, said modulator having carrier input connections, a control circuit, and an output circuit, said carrier input connections being inserted in the plate circuit of said tube, said control circuit being connected to receive a modulating signal voltage, a dephaser adapted to cause a constant dephasing of substantially 90 degrees, and said output circuit being connected to the grid of said tube through said dephaser.

2. A system according to claim 1, said modulator being a ring modulator.

3. A system according to claim 1, said modulator being a ring modulator comprising four rectifier elements connected in bridge, a center tapped transformer winding connected to two terminals of said bridge, and two series connected capacities connected to the other two terminals of said bridge, the modulating input signal being applied to said last mentioned terminals across said condensers, and the plate of said tube being connected to the common terminal of said two condensers.

JEAN LOUIS HURAULT.

REFERENCES CITED

The following references are of record in the file of this patent:

UNITED STATES PATENTS

| Number | Name | Date |
|---|---|---|
| 2,347,398 | Crosby | Apr. 25, 1944 |
| 2,458,574 | Dow | Jan. 11, 1949 |